(12) United States Patent
Palmer et al.

(10) Patent No.: US 9,156,016 B2
(45) Date of Patent: Oct. 13, 2015

(54) APPARATUS AND METHOD FOR MAKING SOLID BEADS

(75) Inventors: Daniel Palmer, Cardiff (GB); Owen Shadick, Derby (GB)

(73) Assignee: MIDATECH PHARMA (WALES) LIMITED, Cardiff (GB)

( * ) Notice: Subject to any disclaimer, the term of this patent is extended or adjusted under 35 U.S.C. 154(b) by 67 days.

(21) Appl. No.: 13/876,773

(22) PCT Filed: Sep. 30, 2011

(86) PCT No.: PCT/GB2011/051858
§ 371 (c)(1),
(2), (4) Date: Jun. 13, 2013

(87) PCT Pub. No.: WO2012/042273
PCT Pub. Date: Apr. 5, 2012

(65) Prior Publication Data
US 2013/0259961 A1     Oct. 3, 2013

(30) Foreign Application Priority Data

Sep. 30, 2010   (GB) .................................. 1016433.3

(51) Int. Cl.
*B29B 9/00* (2006.01)
*B01J 2/06* (2006.01)
(Continued)

(52) U.S. Cl.
CPC .... *B01J 2/06* (2013.01); *B01J 2/08* (2013.01); *B01J 2/18* (2013.01)

(58) Field of Classification Search
CPC .................. B01J 2/06; B01J 2/08; B01J 2/18
USPC ........................................ 425/7–10; 264/5–14
See application file for complete search history.

(56) References Cited

U.S. PATENT DOCUMENTS 3,845,179 A * 10/1974 Wace .............................. 264/14
4,043,507 A     8/1977 Wace
(Continued)

FOREIGN PATENT DOCUMENTS

CN     101160167     4/2008
EP     1142567       10/2001
(Continued)

OTHER PUBLICATIONS

Branski et al.: "A microfluidic droplet generator based on a piezo-electric actuator"; Lab on a Chip, The Royal Society of Chemistry (2009), vol. 9, pp. 516-520.
(Continued)

*Primary Examiner* — Joseph S Del Sole
*Assistant Examiner* — Thukhanh T Nguyen
(74) *Attorney, Agent, or Firm* — Hamre, Schumann, Mueller & Larson, P.C.

(57) ABSTRACT

An apparatus for making solid beads is provided, the apparatus comprising at least one liquid droplet generator operable to generate droplets comprising a solute dissolved in a solvent, and at least one flow channel for carrying a second liquid, at least one liquid droplet generator and at least one flow channel being spaced relative to one another so that, in use, liquid droplets pass through a gas into a second liquid provided in said flow channel, the solvent being soluble in the second liquid so as to cause the solvent to exit the droplets, thus forming solid beads. A method of preparing solid beads is also provided.

17 Claims, 5 Drawing Sheets

(51) Int. Cl.
*B01J 2/08* (2006.01)
*B01J 2/18* (2006.01)

(56) References Cited

U.S. PATENT DOCUMENTS

| | | | |
|---|---|---|---|
| 4,375,347 A | 3/1983 | Lombardo et al. | |
| 4,929,400 A | 5/1990 | Rembaum et al. | |
| 4,938,763 A | 7/1990 | Dunn et al. | |
| 5,019,400 A | 5/1991 | Gombotz et al. | |
| 5,232,707 A | 8/1993 | Lokensgard | |
| 5,278,201 A | 1/1994 | Dunn et al. | |
| 5,324,519 A | 6/1994 | Dunn et al. | |
| 5,330,767 A | 7/1994 | Yamamoto et al. | |
| 5,415,679 A | 5/1995 | Wallace | |
| 5,476,663 A | 12/1995 | Okada et al. | |
| 5,480,656 A | 1/1996 | Okada et al. | |
| 5,500,162 A * | 3/1996 | Theisen et al. | 425/10 |
| 5,534,269 A | 7/1996 | Igari et al. | |
| 5,538,739 A | 7/1996 | Bodmer et al. | |
| 5,575,987 A | 11/1996 | Kamei et al. | |
| 5,599,552 A | 2/1997 | Dunn et al. | |
| 5,631,020 A | 5/1997 | Okada et al. | |
| 5,631,021 A | 5/1997 | Okada et al. | |
| 5,639,480 A | 6/1997 | Bodmer et al. | |
| 5,643,607 A | 7/1997 | Okada et al. | |
| 5,688,530 A | 11/1997 | Bodmer et al. | |
| 5,705,197 A | 1/1998 | Van Hamont et al. | |
| 5,716,640 A | 2/1998 | Kamei et al. | |
| 5,733,950 A | 3/1998 | Dunn et al. | |
| 5,739,176 A | 4/1998 | Dunn et al. | |
| 5,753,618 A | 5/1998 | Cavanak et al. | |
| 5,814,342 A | 9/1998 | Okada et al. | |
| 5,876,761 A | 3/1999 | Bodmer et al. | |
| 5,891,212 A | 4/1999 | Tang et al. | |
| 5,922,338 A | 7/1999 | Brich et al. | |
| 5,922,682 A | 7/1999 | Brich et al. | |
| 5,945,126 A | 8/1999 | Thanoo et al. | |
| 6,036,976 A | 3/2000 | Takechi et al. | |
| 6,083,454 A | 7/2000 | Tang et al. | |
| 6,153,129 A | 11/2000 | Herbert et al. | |
| 6,270,700 B1 | 8/2001 | Ignatious | |
| 6,270,802 B1 | 8/2001 | Thanoo et al. | |
| 6,361,798 B1 | 3/2002 | Thanoo et al. | |
| RE37,950 E | 12/2002 | Dunn et al. | |
| 6,565,874 B1 | 5/2003 | Dunn et al. | |
| 6,626,870 B1 | 9/2003 | Yarborough et al. | |
| 6,737,287 B1 | 5/2004 | Furuse et al. | |
| 6,998,074 B1 | 2/2006 | Radulescu | |
| 7,208,106 B2 | 4/2007 | Shekunov et al. | |
| 7,455,797 B2 * | 11/2008 | Shekunov et al. | 264/5 |
| 7,985,058 B2 | 7/2011 | Gray | |
| 2002/0001608 A1 | 1/2002 | Polson et al. | |
| 2002/0054912 A1 | 5/2002 | Kim et al. | |
| 2002/0160109 A1 | 10/2002 | Yeo et al. | |
| 2002/0193290 A1 | 12/2002 | Feldstein et al. | |
| 2003/0133964 A1 | 7/2003 | Dunn et al. | |
| 2003/0230819 A1 | 12/2003 | Park et al. | |
| 2004/0022939 A1 | 2/2004 | Kim et al. | |
| 2004/0026319 A1 | 2/2004 | Chattopadhyay et al. | |
| 2004/0126431 A1 | 7/2004 | Lagarce et al. | |
| 2004/0126437 A1 | 7/2004 | Ribeiro | |
| 2005/0106257 A1 | 5/2005 | Albayrak | |
| 2005/0206023 A1 * | 9/2005 | Hanna et al. | 264/11 |
| 2006/0055745 A1 | 3/2006 | Yagi | |
| 2007/0154560 A1 | 7/2007 | Hyon | |
| 2007/0196416 A1 | 8/2007 | Li et al. | |
| 2007/0264341 A1 | 11/2007 | Lee et al. | |
| 2008/0019904 A1 | 1/2008 | Boehmer et al. | |
| 2008/0075777 A1 | 3/2008 | Kennedy | |
| 2008/0300339 A1 | 12/2008 | Wright et al. | |
| 2009/0004283 A1 | 1/2009 | Petersen et al. | |
| 2009/0035579 A1 | 2/2009 | Coufal et al. | |
| 2009/0304788 A1 | 12/2009 | Kim et al. | |
| 2010/0237523 A1 | 9/2010 | Bohmer et al. | |
| 2011/0160134 A1 | 6/2011 | Palmer et al. | |
| 2013/0256931 A1 | 10/2013 | Palmer et al. | |

FOREIGN PATENT DOCUMENTS

| | | |
|---|---|---|
| EP | 2103313 | 9/2009 |
| EP | 1355630 | 11/2009 |
| GB | 1048697 | 11/1966 |
| GB | 1297476 | 11/1972 |
| WO | WO 00/27520 | 5/2000 |
| WO | WO 2007/071395 | 6/2007 |
| WO | WO 2008/062908 | 5/2008 |
| WO | WO 2009/053885 | 4/2009 |
| WO | WO 2010/004253 | 1/2010 |

OTHER PUBLICATIONS

Wang et al.: "A novel high-performance counter electrode for dye-sensitized solar cells"; Electrochimica Acta (2005), vol. 50, pp. 5546-5552.

Schober et al.: "Accurate High-Speed Liquid Handling of Very Small Biological Samples"; BioTechniques, vol. 15, No. 2 (1993), p. 324— (6 pages).

Berkland et al.: "Fabrication of PLG microspheres with precisely controlled and monodisperse size distributions"; Journal of Controlled Release, vol. 73 (2001), pp. 59-74.

Fletcher et al.: "Fabrication of polymer microsphere particle standards containing trace explosives using an oil/water emulsion solvent extraction piezoelectric printing process"; Talanta, Elsevier Science B.V., vol. 76 (2008), pp. 949-955.

Choy, Y.B.: "Macromol. Biosci. Apr. 2007"; Macromolecular Bioscience (2007), vol. 7, p. 389.

Sah, Hongkee: "Microencapsulation techniques using ethyl acetate as a dispersed solvent: effects of its extraction rate on the characteristics of PLGA microspheres"; Journal of Controlled Release, vol. 47 (1997), pp. 233-245.

Veldhuis et al.: "Monodisperse Microsphneres for Parenteral Drug Delivery"; Parenteral Delivery, Jan. 2009, vol. 9, No. 1 (5 pages).

Baxter Healthcare Corporation:"Pulmonary Formulation"; Drug Delivery Technology, Oct. 2006, vol. 6, No. 9 (1 page).

Choy et al.: "Uniform Biodegradable Hydrogel Microspheres Fabricated by a Surfactant-Free Electric-Field-Assisted Method"; Macromolecular Bioscience (2007), vol. 7, pp. 423-428.

Choy et al.: "Uniform Ethyl Cellulose Microspheres of Controlled Sizes and Polymer Viscosities and Their Drug-Release Profiles"; Journal of Applied Polymer Science, vol. 112 (2009), pp. 850-857.

Radulescu et al.: "Uniform Paclitaxel-Loaded Biodegradable Microspheres Manufactured by Ink-Jet Technology"; Proc., Recent Adv. in Drug Delivery Sys. Mar. 2003 (6 pages).

* cited by examiner

APPARATUS AND METHOD FOR MAKING SOLID BEADS

The present invention relates to an apparatus and method for making solid beads, in particular, but not exclusively for making small solid beads (typically having a mean greatest dimension of from 20 to 200 microns) of a relatively uniform size.

There are several known apparatus used for the manufacture of solid beads of a relatively uniform size. For example, it is known to use a microfluidic circuit in which, typically, a carrier fluid carried in a first microfluidic conduit impinges on a functional fluid carried in a second microfluidic conduit at a junction where the first and second microfluidic conduits converge. The liquid droplets of functional fluid are then frozen and desolvated. Such a device provides excellent control of particle size and excellent uniformity of size. However, it is difficult to produce large volumes of particles using such devices. The apparatus of the present invention seeks to mitigate this problem.

In accordance with a first aspect of the present invention, there is provided an apparatus for making solid beads, the apparatus comprising at least one liquid droplet generator operable to generate droplets comprising a solute dissolved in a solvent, and at least one flow channel for carrying a second liquid, at least one liquid droplet generator and at least one flow channel being spaced relative to one another so that, in use, liquid droplets pass through a gas into a second liquid provided in said flow channel, the solvent being soluble in the second liquid so as to cause the solvent to exit the droplets, thus forming solid beads.

The liquid droplet generator may be operable to eject liquid droplets with a non-zero initial velocity through the gas into contact with the second liquid. Typically, at least one liquid droplet generator is located above a flow channel so that droplets generated by the droplet generator may impact a second liquid provided in the flow channel.

The apparatus of the present invention has been found to generate solid beads of a relatively uniform size. Furthermore, the apparatus may be used to make such beads relatively quickly.

The apparatus of the present invention facilitates the production of substantially solid beads. The solvent provided in the liquid droplets dissolves in the second liquid, thereby removing the liquid component of the droplet to leave a substantially solid bead. The solute (preferably comprising a polymer) is preferably substantially insoluble in the second liquid.

The apparatus may also comprise a means for generating flow in the at least one flow channel. Such a means may include a pump. The means for generating flow is operable to generate a flow rate of at least 50 ml/min.

The apparatus of the present invention may comprise a plurality of liquid droplet generators. The apparatus may comprise a plurality of flow channels for carrying a second liquid. Each liquid droplet generator is typically arranged to deposit liquid droplets into a flow channel. Each droplet generator may be associated with one flow channel so that one (and only one) droplet generator deposits liquid droplets into one flow channel. Alternatively, more than one droplet generator may be arranged to deposit liquid droplets into one flow channel. If the apparatus comprises a plurality of flow channels, the flow channels may be substantially parallel to one another for at least part of the length (optionally for the majority of the length and optionally for substantially the entire length) of said flow channels.

The apparatus may be provided with means for monitoring the region of one or more flows channel in which the droplets impact the second fluid carried in a flow channel. If the apparatus comprises a plurality of flow channels, the apparatus may be provided with means for monitoring said region of more than one (optionally the majority of and optionally each) flow channel. The means for monitoring may comprise one or more cameras. For example, if the apparatus comprise a plurality of flow channels, the means for monitoring may comprise a plurality of cameras, one (and only one) camera monitoring each channel.

The apparatus may comprise a bead collection receptacle for receiving beads from one or more flow channel. If the apparatus comprises a plurality of flow channels, the bead collection receptacle may be arranged to receive beads from each of the flow channels.

The apparatus may be provided with one or more waste collection receptacle. The apparatus may be provided with one waste collection receptacle for each liquid droplet generator.

The dimensions of a flow channel may vary according to typical experimental conditions. For example, the length of a flow channel may be dictated to some extent by the speed of desolvation of a liquid droplet and the flow rate of the second liquid through a flow channel. Typically, the length of a flow channel may be from 10 to 1000 mm, optionally from 20 to 200 mm and further more optionally from 30 to 100 mm.

It is preferred that a droplet generator and flow channel are arranged so that the length of the flow channel downstream of the point at which a droplet first contacts the second liquid is at least 1 times (optionally at least 2 times and further optionally at least 3 times) greater than the length of the flow channel upstream of said droplet introduction point.

At least one (optionally more than one, further optionally a majority of and further more optionally each) flow channel may have a substantially uniform cross section.

At least one (optionally more than one, further optionally a majority of and further more optionally each) flow channel may be substantially U shaped in cross-section. The shape is simple to manufacture. The U shape may be a flat-bottomed or round bottomed U shape.

At least one (optionally more than one, further optionally a majority of and further more optionally each) flow channel may be substantially V shaped in cross-section.

The depth of at least one (optionally more than one, further optionally a majority of and further more optionally each) flow channel is greater than its width. Such an arrangement may provide shielding of the droplets (which are typically of a very low mass) from any ambient air movements.

The width of at least one (optionally more than one, further optionally a majority of and further more optionally each) flow channel may be from 0.5 to 20 mm, optionally from 1 to 10 mm and further optionally from 2 to 6 mm. Such a channel is sufficiently wide to enable relatively simple setting-up of the apparatus whilst not requiring large volumes of second liquid. For example, alignment of a droplet generator and a flow channel is simplified by having a flow channel of such width. Furthermore, such channels facilitate the obtaining of desired flow velocities.

The depth of at least one (optionally more than one, further optionally a majority of and further more optionally each) flow channel may be from 0.5 to 20 mm, optionally from 1 to 10 mm and further optionally from 2 to 10 mm. Such a channel is sufficiently deep to provide some shielding from any ambient air movements which may have an unwanted effect on the droplets.

The droplet generator may comprise a droplet-generating orifice. The closest spacing between the droplet generating orifice and the surface of a flow of second liquid may typically be from 1 to 50 mm, optionally from 1 to 30 mm, further optionally from 2 to 25 mm and more optionally from 3 to 20 mm.

Typically a flow of second liquid may be from 0.5 to 2 mm deep, and so the closest spacing between the droplet generating orifice and the bottom of a flow channel may typically be from 3 to 50 mm, optionally from 3 to 30 mm, further optionally from 4 to 25 mm and more optionally from 4 to 20 mm.

At least one (optionally more than one, further optionally a majority of and further more optionally each) liquid droplet generator comprises a piezoelectric component operable to generate droplets. Typically, the piezoelectric component is operable to generate pressure in a reservoir or chamber, thus causing liquid to be expelled through an aperture and droplets to be formed.

The apparatus may comprise at least one support for a liquid droplet generator. Such a support may hold a droplet generator in spaced relationship to a flow channel. Such a support may support more than one liquid droplet generator.

If the apparatus comprises a plurality of liquid droplet generators, the support may support a majority, and optionally all, of said liquid droplet generators. The support may also support the means for monitoring the region of one or more flows channel in which the droplets impact the second fluid carried in a flow channel, if present.

The apparatus may comprise at least one signal generator operable to control the operation of at least one liquid droplet generator. A single signal generator may be used to control the operation of more than one (and optionally each) liquid droplet generator. If at least one liquid droplet generator comprises a piezoelectric component, a signal generator may be operable to apply to the piezoelectric component a signal having a frequency of from 200 to 10000 Hz, optionally of from 400 to 6000 Hz and further optionally of from 500 to 4000 Hz. The signal shape may be square, for example. The signal generator may be operable to apply to the piezoelectric component a signal having a pulse length of from 3 to 50 µs, optionally of from 5 to 30 µs and further optionally of from 7 to 20 µs. The gap between pulses may be from 400 to 2000 µs. For example, if the frequency of the electrical signal is from 500-800 Hz, the gap between pulses may typically be from 1200 to 1600 µs. For example, if the frequency of the electrical signal is from 1700-2300 Hz, the gap between pulses may typically be from 400 to 600 µs.

The apparatus may comprise a heater for heating liquid prior to the formation of droplets. If at least one liquid droplet generator comprises a piezoelectric component, it is preferred that said at least one liquid droplet generator comprises a nozzle for the dispensing of droplets, with the heater being operable to heat the nozzle to a temperature of up to 80° C. Heating the first liquid reduces its viscosity, thereby facilitating the formation of droplets.

The apparatus may comprise a heater operable to heat the second liquid. The apparatus may comprise a cooler operable to cool the second liquid. One device, such as a Peltier device, may be used to heat and cool the second liquid. It has been found that the temperature of the second liquid may affect one or more characteristics of the solid beads, and therefore it may be desirable to heat or cool the second liquid. For example, the temperature of the second liquid may affect one or more of the size, porosity and efficiency with which the based encapsulates any load, such as a pharmaceutical.

The flow channel may be formed in a flow channel carrier.

The flow channel may be laterally movable. This may assist in the alignment of the flow channel and the liquid droplet generator relative to one another (this being important in ensuring that the droplets generated by the liquid droplet generator fall into the flow channel). In this connection, the flow channel carrier (if present) may be mounted for lateral movement.

The flow channel may be pivotally movable. This may assist in the alignment of the flow channel and the liquid droplet generator relative to one another (this being important in ensuring that the droplets generated by the liquid droplet generator fall into the flow channel). In this connection, the flow channel carrier (if present) may be mounted for pivotal movement.

The apparatus may be provided with means for aligning the flow channel and liquid droplet generator relative to one another to ensure that the liquid droplet generator is operable to dispense droplets into the second liquid in the flow channel.

The means for aligning the flow channel and liquid droplet generator may comprise one or more alignment surfaces for contacting the flow channel carrier (if present), contact of the one or more alignment surfaces with the flow channel carrier causing the flow channel carrier to be aligned to receive droplets from the liquid droplet generator. The means for aligning the flow channel and liquid droplet generator may comprise two alignment surfaces, typically one either side of the flow channel carrier. At least part of at least one of the alignment surfaces may be curved. The two alignment surfaces may define a spacing therebetween. The spacing between the two alignment surfaces may be larger at one end of the alignment surfaces than at the other end. This facilitates simple alignment of the flow channel relative to the droplet generator.

The one or more alignment surfaces may be associated with the liquid droplet generator. The apparatus may be provided with a liquid droplet generator support, in which case the one or more alignment surfaces may be integral with, or attached to, the liquid droplet generator support. Such an apparatus facilitates the alignment of the flow channel relative to the liquid droplet generator. Typically, when the apparatus is being set-up, translational movement of the liquid droplet generator and the two alignment surfaces causes the flow channel carrier to be received in the spacing between the two alignment surfaces. The spacing between the two alignment surfaces is such that, when the flow channel carrier is in its final position, the flow channel and liquid droplet generator are aligned properly so that droplets may be dispensed into the centre of the flow channel.

The flow channel may be tilted. Tilting the flow channel assists in the movement of beads along the channel and helps prevent beads from adhering to the end of the channel. This may be an issue if the channel is formed in a material which does not have a low surface energy, such as material being steel. The angle of tilt may be from 0.5 to 30° and optionally from 1 to 20°.

The angle of tilt may be variable, for example, from 0.5 to 30° and optionally from 1 to 20°.

The apparatus may comprise a means for tilting the flow channel. The means for tilting the flow channel typically comprises a means for tilting the flow channel carrier (if the apparatus comprises a flow channel carrier). The means for tilting the flow channel may be operable to vary the angle of tilt. The means for tilting the flow channel may comprise one or more (and typically two) first surfaces associated with the flow channel and one or more (and typically two) second surfaces associated with the liquid droplet generator, each first surface engaging with a corresponding second surface to tilt the flow channel. One or more (and typically each) of the first surfaces typically faces substantially downwards. One or more (and typically each) of the second surfaces typically faces upwards. At least one (and typically each) of the first surfaces may be provided by a laterally-projecting lip, which may project inwardly or outwardly. The apparatus typically comprises two such lips, one either side of the flow channel. At least one of the first surfaces may be sloped relative to the flow channel. At least one (and typically each) of the second surfaces may be provided by a projection. Said projections may optionally project outwardly.

The apparatus may be operable such that movement of the liquid droplet generator causes movement of the at least one second surface, movement of the at least one second surface relative to the first surface causing the degree of tilt of the flow channel to change.

In accordance with a second aspect of the present invention, there is provided a kit for the construction of an apparatus in accordance with the first aspect of the present invention, the kit comprising at least one liquid droplet generator and at least one flow channel for carrying a second liquid. The at least one flow channel and the at least one liquid droplet generator may comprise those features described above in relation to the apparatus of the first aspect of the present invention.

The kit may further comprise instructions for arranging the at least one liquid droplet generator and the at least one flow channel in spaced relation to one another to construct an apparatus in accordance with the first aspect of the present invention.

The kit may also comprise one or more of: at least one support, at least one means for generating flow in at least one flow channel and at least one signal generator. Those components may have those features described above in relation to the apparatus of the first aspect of the present invention.

In accordance with a third aspect of the present invention, there is provided a method of making solid beads, the method comprising:

Generating liquid droplets of a first liquid, the first liquid comprising a solute dissolved in a solvent, Passing said liquid droplets through a gas, Contacting said liquid droplets with a flow of a second liquid, the solvent being soluble in the second liquid so as to cause the solvent to exit said droplets thus forming solid beads.

The method of the present invention has been found to be surprisingly good at producing beads which are substantially spherical. The solute (typically comprising a polymer) is typically insoluble in the second solvent so that the solvent (and not the solute) is extracted from the droplet.

The method may comprise ejecting said liquid droplets through a gas into contact with the second liquid. The method may additionally or alternatively comprise passing liquid droplets through a gas under the influence of gravity into contact with the second liquid. For example, a piezoelectric dispenser arranged in a typical orientation ejects droplets downwards with a non-zero initial velocity. The droplets also fall under the influence of gravity if the piezoelectric dispenser is arranged to dispense droplets downwards.

The droplets may pass through from 1 to 50 mm of gas (typically air), optionally from 1 to 30 mm, further optionally from 2 to 25 mm and more optionally from 3 to 20 mm of gas.

The flow rate of the second liquid may be at least 50 ml/min.

The method of the present invention may typically be used to make solid beads having a mean greatest dimension of from 10 to 200 µm, preferably 20 to 150 µm and more preferably 40 to 120 µm. It is preferred that the solid beads are substantially spherical. It is preferred that the coefficient of variation of the greatest dimension of the beads is 0.1 or less and preferably 0.06 or less. The coefficient of variation is the standard deviation of the greatest dimension divided by the mean greatest dimension.

The ratio of the mean diameter of the liquid droplets to the mean largest dimension of the beads (typically the mean diameter, if the beads are substantially spherical) may be less than about 4:1, optionally less than about 3:1, further optionally less than about 2:1 and optionally less than about 1.5:1. The size of droplets may be measured, for example, using a high speed camera.

The solute may comprise a polymer, typically a biocompatible polymer. "Biocompatible" is typically taken to mean compatible with living cells, tissues, organs, or systems, and posing no risk of injury, toxicity, or rejection by the immune system. Examples of polymers which may be used are polylactides (with a variety of end groups), such as Purasorb PDL 02A, Purasorb PDL 02, Purasorb PDL 04, Purasorb PDL 04A, Purasorb PDL 05, Purasorb PDL 05A Purasorb PDL 20, Purasorb PDL 20A; polyglycolides (with a variety of end groups), such as Purasorb PG 20; polycaprolactones; polyanhydrides, and copolymers of lactic acid and glycolic acid (with a variety of end groups, L:G ratios and molecular weight can be included), such as Purasorb PDLG 5004, Purasorb PDLG 5002, Purasorb PDLG 7502, Purasorb PDLG 5004A, Purasorb PDLG 5002A, resomer RG755S, Resomer RG503, Resomer RG502, Resomer RG503H, Resomer RG502H, RG752, RG752H, or combinations thereof. In some cases, it is preferred that the solute is substantially insoluble in water (it is convenient to use water as the second liquid).

The concentration of polymer in the first liquid may be from 1 to 50% w/v, typically at least 7% w/v, optionally least 10% w/v, typically at least 15% w/v, optionally form 15 to 35% w/v, optionally at least 20% w/v, optionally from 20 to 45% w/v and further optionally from 30 to 45% w/v. The weight ('w') mentioned above is the weight of the polymer and 'v' is the volume of the solvent.

As previously indicated, the solvent is soluble in the second liquid, "soluble" indicating a solubility of at least 2 g of solvent in 100 ml of second liquid at the temperature at which the method is being performed.

It is preferred that the solubility of the solvent in the second liquid is at least 5 g of solvent per 100 ml of second liquid and optionally at least 10 g/100 ml of second liquid.

It is preferred that the solvent is miscible with the second liquid. If the second liquid comprises water, it is preferred that the solvent is a water-miscible organic solvent, such as dimethyl sulfoxide (DMSO), n-methyl pyrrolidone, PEG-200, PEG-400, glycofurol and hexafluoro-isopropanol.

The weight average molecular weight (MW) of the polymer may be from 4 to 700 kDaltons, particularly if the polymer comprises a poly (α-hydroxy) acid. If the polymer comprises a copolymer of lactic and glycolic acid (often called "PLGA"), said polymer may have a weight average molecular weight of from 4 to 120 kDaltons, preferably of from 4 to 15 kDaltons.

If the polymer comprises a polylactide, said polymer may have a weight average molecular weight of from 4 to 700 kDaltons.

The polymer may have an inherent viscosity of from 0.1-2 dl/g, particularly if the polymer comprises a poly (α-hydroxy) acid.

If the polymer comprises a copolymer of lactic and glycolic acid (often called "PLGA"), said polymer may have an inherent viscosity of from 0.1 to 1 dl/g, and optionally of from 0.14 to 0.22 dl/g. If the polymer comprises a polylactide, said polymer may have an inherent viscosity of from 0.1 to 2 dl/g, and optionally of from 0.15 to 0.25 dl/g. If the polymer comprises a polyglycolide, said polymer may have an inherent viscosity of from 0.1 to 2 dl/g, and optionally of from 1.0 to 1.6 dl/g.

It is preferred that the first liquid comprises a target material which is desired to be encapsulated within the solid beads. The target material may be incorporated in the first liquid as a particulate or may be dissolved. The target material may comprise a pharmaceutically active agent, or may be a precursor of a pharmaceutically active agent. The pharmaceutically active agent may be, for example, any agent that is suitable for parenteral delivery, including, without limitation, fertility drugs, hormone therapeuticals, protein therapeuticals, anti-infectives, antibiotics, antifungals, cancer drugs, pain-killers, vaccines, CNS drugs, and immunosupressants. The delivery of drugs in polymer beads, especially by controlled release parenteral delivery, has particular advantages in the case of drugs which, for example, have poor water-solubility, high toxicity, poor absorption characteristics, although the invention is not limited to use with such agents. The active agent may be, for example, a small molecular drug, or a more complex molecule such as a polymeric molecule. In one advantageous embodiment, the pharmaceutically active agent may comprise a peptide agent. The term "peptide agent" includes poly(amino acids), often referred to generally as "peptides", "oligopeptides", "polypeptides" and "proteins". The term also includes peptide agent analogues, derivatives, acylated derivatives, glycosylated derivatives, pegylated derivatives, fusion proteins and the like. Peptide agents which may be used in the method of the present invention include (but are not limited to) enzymes, cytokines, antibodies, vaccines, growth hormones and growth factors. Further examples of suitable peptide agents are given in US2007/0196416 (see, in particular, paragraphs [0034] to [0040]). In a preferred embodiment, the pharmaceutically active agent is a gonadotropin releasing hormone receptor (GnRHR) agonist. Gonadotropin releasing hormone receptor agonists are often known to those skilled in the art as gonadotropin releasing hormone (GnRH) agonists. For example, the GnRHR agonist may be leuprorelin (commonly known as leuprolide) or a precursor thereof.

The target material (especially in the case of an pharmaceutically active agent or a precursor thereof) may be provided in an amount of 2-60% w/w compared to the weight of the polymer, optionally from 5 to 40% w/w, further optionally from 5 to 30% w/w and more optionally from 5-15% w/w.

If the target material comprises a peptide agent, the first liquid may comprise one or more tertiary structure alteration inhibitors. Examples of tertiary structure alteration inhibitors are: saccharides, compounds comprising saccharide moieties, polyols (such as glycol, mannitol, lactitol and sorbitol), solid or dissolved buffering agents (such as calcium carbonate and magnesium carbonate) and metal salts (such as $CaCl_2$, $MnCl_2$, NaCl and $NiCl_2$). The first liquid may comprise up to 25% w/w tertiary structure alteration inhibitors, the weight percentage of the tertiary structure alteration inhibitor being calculated as a percentage of the weight of the polymer. For example, the first liquid may comprise from 0.1 to 10% w/w (optionally from 1 to 8% w/w and further optionally from 3 to 7% w/w) metal salt and 0.1 to 15% w/w (optionally from 0.5 to 6% w/w and further optionally from 1 to 4% w/w) polyol.

The second liquid may comprise any liquid in which the solute (typically a polymer) is substantially insoluble. Such a liquid is sometimes referred to as an "anti-solvent". Suitable liquids may include, for example, water, methanol, ethanol, propanol (e.g. 1-propanol, 2-propanol), butanol (e.g. 1-butanol, 2-butanol, tert-butanol), pentanol, hexanol, heptanol, octanol and higher alcohols; diethyl ether, methyl tert butyl ether, dimethyl ether, dibutyl ether, simple hydrocarbons, including pentane, cyclopentane, hexane, cyclohexane, heptane, cycloheptane, octane, cyclooctane and higher hydrocarbons. If desired, a mixture of liquids may be used.

The second liquid preferably comprises water, optionally with one or more surface active agents, for example, alcohols, such as methanol, ethanol, propanol (e.g. 1-propanol, 2-propanol), butanol (e.g. 1-butanol, 2-butanol, tert-butanol), isopropyl alcohol, Polysorbate 20, Polysorbate 40, Polysorbate 60 and Polysorbate 80. Surface active agents, such as alcohols, reduce the surface tension of the second liquid receiving the droplets, which reduces the deformation of the droplets when they hit the second liquid, thus decreasing the likelihood of non-spherical droplets forming. This is particularly important when the extraction of solvent from the droplet is rapid.

If the second liquid comprises water and one or more surface active agents, the surface active agent content may be from 1 to 95% v/v, optionally from 1 to 30% v/v, optionally from 1 to 25% v/v, further optionally from 5% to 20% v/v and further more optionally from 10 to 20% v/v. The % volume of surface active agent is calculated relative to the volume of the second liquid.

It is possible that the composition of the second liquid may vary as a function of distance from the point at which the liquid droplets first contact the second liquid. For example, the concentration of surface active agent in the second liquid may vary as a function of the distance from the point at which the liquid droplets first contact the second liquid. For example, at the point at which the droplets contact the second liquid, the concentration of the surface active agent may be relatively high (for example, 30-50% v/v) to facilitate the formation of spherical beads. Downstream of the point at which the droplets first contact the second liquid, the concentration of surface active agent may be lower. This may be achieved, for example, by introducing more of that liquid which makes up the majority of the second liquid (such as water) to the flow of the second liquid. The introduction of said liquid may increase the rate at which the solvent is extracted from the droplets so as to form beads.

The method of the present invention may therefore comprise, subsequent to contacting said droplets with the second liquid, reducing the concentration of surface active agent in the second liquid surrounding said droplets.

The concentration of surface active agent in the second liquid downstream of the point at which droplets are first contacted with the second liquid may therefore be lower than the concentration of surface active agent in the second liquid at the point at which droplets are first contacted with the second liquid.

It is preferred that the second liquid comprises water (i.e. is aqueous), and has a surface tension of less than 60 $mNm^{-1}$, optionally less than 50 $mNm^{-1}$, further optionally less than 40 $mNm^{-1}$ and further optionally less than 35 $mNm^{-1}$.

If a target material is provided in the first liquid, the second liquid may be provided with one or more osmolarity altering agents, such as salts and/or polyols. The osmolarity altering agents are added to the second liquid to produce an osmolarity which assists in retaining the target material inside the beads, once formed, by inhibiting a significant amount of diffusion of the target material into the second liquid. The osmolarity altering agent may comprise metal salts (such as chlorides of sodium and magnesium) and polyols, such as glycol, mannitol, lactitol and sorbitol.

The total concentration of osmolarity altering agents may be from 0.1 to 2M, typically from 0.2 to 1M and optionally from 0.3 to 0.8M. For example, a second liquid may comprise a 0.4M solution of NaCl and a 0.4M solution of sorbitol, the second liquid therefore comprising a total concentration of osmolarity altering agents of 0.8M.

The temperature of the second liquid as it is first contacted by the droplets may be ambient temperature or above. There is generally no need in the method of the present invention to cool the second liquid in order to cool the droplets. It may be desirable sometimes for the second liquid to be at less than ambient temperature. The temperature of the second liquid as it is first contacted by the droplets may be from 0 to 25° C., optionally from 5 to 20° C., optionally from 5 to 15° C. and optionally from 5 to 10° C. It has been found that the temperature of the second liquid may affect one or more characteristics of the beads so produced. For example, it has been found that when the second liquid is at a lower temperature, then the beads made may contain a larger amount of load (such as a pharmaceutical), may be less porous and release the load over a longer time scale.

The pH of the second liquid may be from 3 to 10, for example. It has been found that the pH of the second liquid may have an effect on the surface morphology of the bead.

In the region of the second liquid in which the droplets first contact the second liquid, the second liquid may have a depth of at least 0.1 mm, optionally at least 0.3 mm, and further optionally a depth of from 0.3 to 1 mm.

In the region of the second liquid in which the droplets first contact the second liquid, the second liquid may have a depth of at least twice the mean greatest dimension of the droplets, optionally at least three times the mean greatest dimension of the droplets and further optionally a depth of between three times and fifty times the mean greatest dimension of the droplets.

The solute may comprise a biocompatible polymer, the concentration of the polymer in the first liquid being at least 20% w/v (and preferably from 20 to 45% w/v), and the solvent is miscible in the second liquid, 'w' indicating the weight of the polymer and 'v' indicating the volume of the solvent. This provides an effective method of producing solid beads. The miscibility of the solvent in the second liquid facilitates rapid desolvation of the droplets. High polymer concentration facilitates the production of structurally-sound beads which, it is believed, are less porous than those produced using low polymer concentration solutions.

The solute may comprise a biocompatible polymer, the concentration of the polymer in the first liquid being at least 20% w/v (and preferably from 20 to 45% w/v), and the beads so produced have a coefficient of variation in their greatest dimension of 0.1 or less (and preferably of 0.06 or less), 'w' indicating the weight of the polymer and 'v' indicating the volume of the solvent.

T solute may comprise a biocompatible polymer, the concentration of the polymer in the first liquid being at least 20% w/v (and preferably from 20 to 45% w/v), and the liquid droplets of the first liquid are generated using a piezoelectric component, 'w' indicating the weight of the polymer and 'v' indicating the volume of the solvent. High polymer concentration facilitates the production of structurally-sound beads which, it is believed, are less porous than those produced using low polymer concentration solutions.

The step of generating liquid droplets may be performed using any suitable technique which facilitates dispensing of droplets through a gas (preferably air). This step is preferably performed using a piezoelectric component. The step of generating liquid droplets may comprise applying an electrical signal to the piezoelectric component. The frequency of the electrical signal may be from 200 to 10000 Hz, optionally from 400 to 6000 HZ and further optionally from 500 to 4000 Hz. The signal shape may be square, for example. The signal may have a pulse length of from 3 to 50 µs, optionally from 5 to 30 µs and further optionally from 7 to 20 µs. The gap between pulses may be from 400 to 2000 µs. For example, if the frequency of the electrical signal is from 500-800 Hz, the gap between pulses may typically be from 1200 to 1600 µs. For example, if the frequency of the electrical signal is from 1700-2300 Hz, the gap between pulses may typically be from 400 to 600 µs. The voltage of the signal may be from 30 to 100V and optionally from 40 to 80V.

The method may comprise heating the first liquid prior to the formation of liquid droplets. The first liquid may be heated to a temperature of from 50 to 100° C. and optionally from 50 to 80° C. Heating the first liquid reduces the viscosity, thereby facilitating the formation of droplets.

The method may comprise providing one or more of:

One or more flow channels in which the second liquid flows;

One or more liquid droplet generators for generating droplets of the first liquid;

One or more means for producing the flow of the second liquid;

One or more supports for supporting the liquid droplet generator; and

One or more signal generators for controlling the operation of the liquid droplet generator.

Said flow channel(s), liquid droplet generator(s), means for producing the flow of the second liquid, support(s) and signal generator(s) may have those features described above in relation to the apparatus of the first aspect of the present invention. If one or more flow channel is provided, the flow channel(s) may be tilted.

For the avoidance of doubt, solid beads may be in the form of gels.

It is possible that the first liquid need not comprise a solute dissolved in a solvent. It may be possible for the first liquid to comprise a carrier liquid in which solid particulate is dispersed. Likewise, the liquid dispensed by the liquid droplet generator in the apparatus of the first aspect of the present invention may comprise a carrier liquid in which solid particulate is dispersed.

The method may comprise providing an apparatus in accordance with the first aspect of the present invention.

In accordance with a fourth aspect of the present invention, there is provided one or more beads made or makeable by a method in accordance with the method of the third aspect of the present invention.

The invention will now be described by way of example only with reference to the following figures of which:

Figure 1:
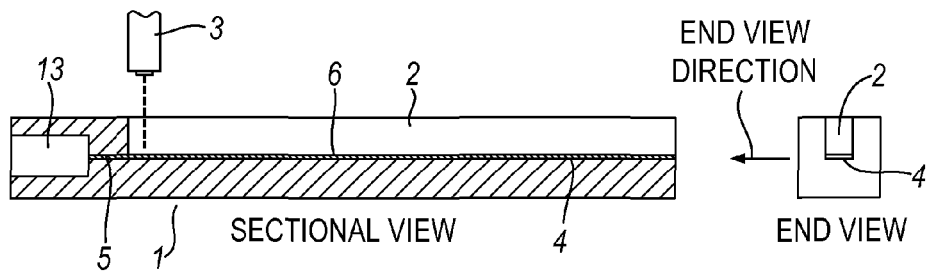
FIG. 1 shows a cross-sectional view of an example of an embodiment of an apparatus in accordance with present invention.

FIG. 1 shows an example of an apparatus in accordance with the present invention. FIG. 1 shows a side-on cross-section through the apparatus and an end-on view of part of the apparatus. The apparatus is denoted generally by reference numeral 1, and comprises a flow channel 2 in spaced relationship with a piezoelectric droplet generator 3 [Microdrop Technologies GmbH, Norderstedt, Germany]. The channel 2 is formed in 316 stainless steel, and has two parts; a first "open" portion denoted generally by reference numeral 6, this portion of the channel being 6 mm deep and 12 mm wide, and a second (enclosed) portion 5. A nozzle (not shown) is inserted into cavity 13 and a pump (not shown) delivers a liquid 4 into flow channel 2. The pump is an annular gear pump, but may be any pulseless flow device. The distance between the dispensing nozzle (not shown) of the piezoelectric droplet generator and the surface of the liquid 4 is 12 mm. The liquid in the present case is 15% v/v tert-butyl alcohol (Sigma Aldrich, UK) in water. The depth of liquid is determined by the height of the enclosed portion 5 of the flow channel 2. In the present case, the depth of the liquid 4 is about 0.5 mm. The flow rate of the liquid 4 was about 60 ml/min. This is calculated from the volumetric flow rate and cross section of the flow profile.

Droplets of polymer dissolved in a solvent were dispensed by piezoelectric droplet generator 3 as follows. A 20% w/v solution of a copolymer of lactic and glycolic acids (Resomer RG752H, Boehringer Ingelheim, Germany) in dimethyl sulfoxide (DMSO) was prepared. Leuprolide was also dissolved in the DMSO, the amount of leuprolide being 12.5% w/w compared to the weight of the polymer. The piezoelectric droplet generator 3 was used to dispense droplets of the polymer solution by applying an electric signal of a frequency of 2000 Hz, a pulse length of 7 microseconds and a voltage of 82V to the piezoelectric droplet generator 3. The dispensing nozzle of the piezoelectric droplet generator 3 was heated to a temperature of 70° C. to facilitate dispensing of the liquid. The droplets of polymer solution were dispensed into the flow of liquid 4 a distance of about 80 mm from the end of flow channel 2. The continuously flowing liquid 4 ensured that droplets and beads in the flowing liquid are spaced from one another so that they do not coalesce. It is believed that the DMSO dissolves in the liquid 4, to generate a solid bead. DMSO is miscible with the water/alcohol mixture (liquid 4), but the PLGA polymer is insoluble in the water/alcohol mixture.

Figure 2A:
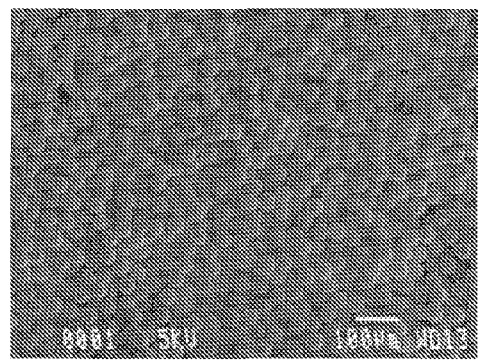
FIGS. 2A and 2B are scanning electron micrograph images of beads made using the apparatus of FIG. 1.
Figure 2B:
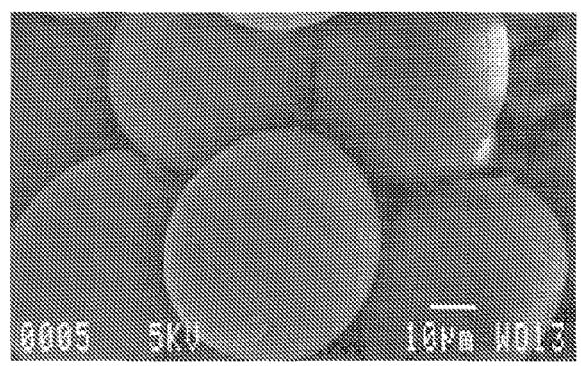
Figure 3:
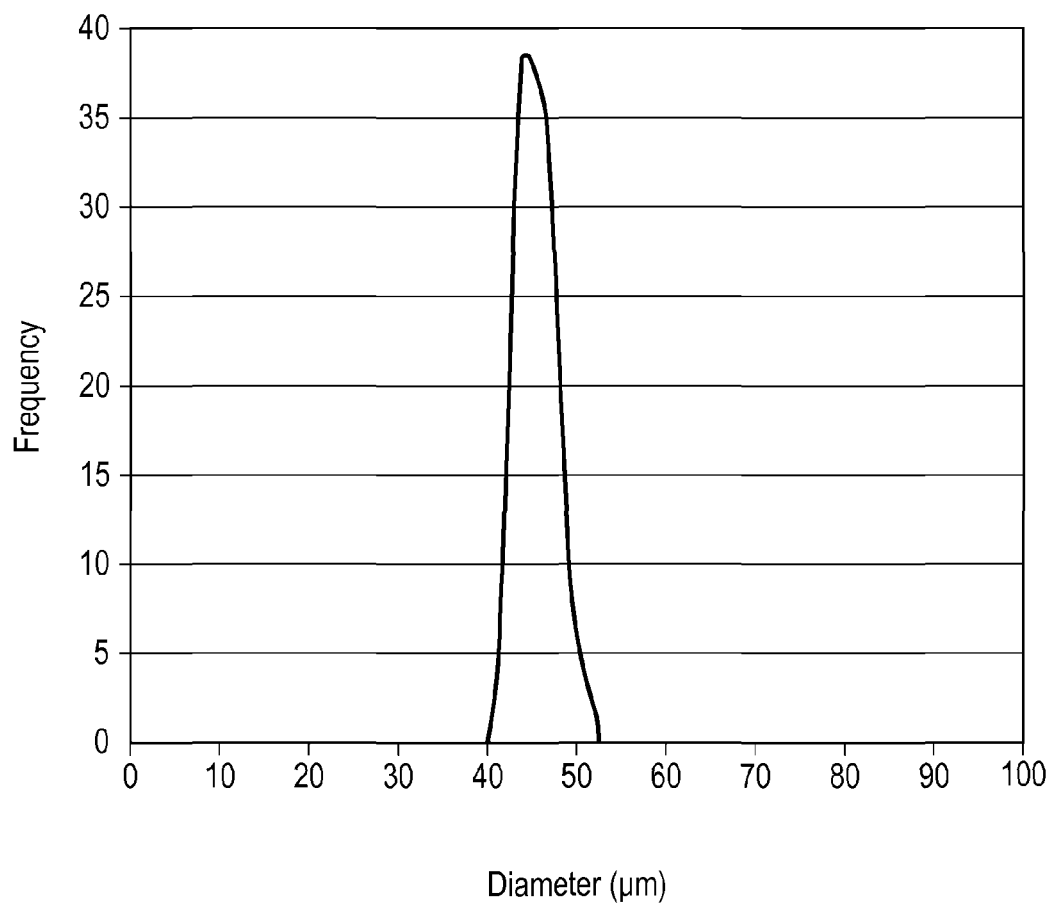
FIG. 3 is a histogram showing the size distribution of beads made using the apparatus of FIG. 1.

The liquid 4 was collected as it left the flow channel 2. It was found that the droplets had already formed solid beads by the time that they had left the flow channel 2, indicating that desolvation of the droplets has been rapid. FIGS. 2A and 2B show electron microscopy images of the beads made as described. Those figures show the sphericity of the beads and their monodisperse nature. A histogram showing the size distribution of the beads of FIGS. 2A and 2B is shown in FIG. 3. The mean bead diameter was 45 µm, with a coefficient of variation of 5%. The beads, once isolated from the liquid 4, were a fine, free-flowing white powder. The beads could be resuspended in a liquid carrier and passed through a suitably-sized hypodermic needle (such as a 23G or 27G needle).

The surface tension of liquid 4 which receives the droplets was measured to be about 30.5 mNm$^{-1}$ using a Wilhelmy plate method. The experiment described above was repeated using water as liquid 4 i.e. without any tert-butyl alcohol. The droplets formed lenticular beads i.e. beads in the shape of a lens. The beads appeared to be large in diameter in comparison to the spherical beads generated when the alcohol was used. Furthermore, the beads did not appear to be as monodisperse as the spherical beads made when the alcohol was used. The measured surface tension of water was 68 mNm$^{-1}$. Whilst not wishing to be bound by theory, it is thought that the higher surface tension of the water (when used without alcohol) causes greater deformation of the droplet when it impacts the surface of the liquid. Furthermore, the DMSO may leave the liquid droplet more quickly when immersed in water alone than when immersed in a mixture of water and tert-butyl alcohol. The DMSO may therefore leave the droplet, when immersed in water alone, before the droplet can regain its former spherical shape.

The effect of changing the polymer concentration in the solvent was investigated using the general method described above in relation to FIGS. 1, 2A, 2B and 3. The liquid receiving the droplets was a 15% v/v solution of tert-butyl alcohol in water. The solvent was DMSO and the polymer was Resomer RG752H (Boehringer Ingelheim, Germany). The mean bead diameter, coefficient of variation, and mean encapsulation efficiency are shown in Table 1 as a function of the concentration of the polymer solution used to make the droplets.

TABLE 1

| Polymer conc (% w/v) | Mean diameter (µm) | Coefficient of variation | Mean encapsulation efficiency (%) |
|---|---|---|---|
| 10 | 34.9 | 0.072 | 33.3 |
| 20 | 39.1 | 0.069 | 43.5 |
| 30 | 47.6 | 0.041 | 56.6 |
| 40 | 49.6 | 0.056 | 59.5 |

The mean encapsulation efficiency was measured using HPLC analysis. One technique which could be used to measure mean encapsulation efficiency is the British Pharmacopeia technique, as is well known to those skilled in the art.

The beads showed a high sphericity. Furthermore, in each case, it is estimated that the beads were formed (i.e. the droplets desolvated) in a matter of 5-15 seconds.

Attempts were made to make beads using a liquid comprising 5% w/v of polymer in solvent. The beads made using this solution were ill-defined and polydisperse and were formed in low yield.

The data of Table 1 demonstrate that it is possible to make monodisperse solid beads quickly with a suitable encapsulation efficiency, and to tune bead characteristics by adapting the method used to make the beads.

Beads were made by depositing droplets comprising 20% w/v PLGA in DMSO solvent and 10% w/w Leuprolide acetate (10% weight peptide in relation to weight of polymer) into a mixture of water and tert-butanol (85%:15%) which acted as an antisolvent as described above. The effect of the temperature of the droplet-receiving liquid on the physical structure of the beads so produced was studied using scanning electron microscopy (SEM). When the temperature of the droplet-receiving liquid was approx. 18° C., SEM images indicated that the beads had a smooth surface morphology and had a highly porous internal structure. When the temperature of the droplet-receiving liquid was approx. 12° C., the beads had a more dense internal structure, and the pores inside the bead were of smaller size. When the temperature of the droplet-receiving liquid was approx. 5° C., SEM images indicated that the beads had a more dense internal structure. It is anticipated that the internal structure of the bead has an effect on the timescale over which any loading within the bead is released. It is therefore possible to use the temperature of the droplet-receiving liquid to alter the load-release characteristic of the bead.

Further beads were made by depositing droplets comprising 40% w/v PLGA in DMSO solvent and 20% Leuprolide into [water-tert butanol (85:15)] which acted as an antisolvent as described above. The effect of the temperature of the droplet-receiving liquid on the mean bead diameter and encapsulation efficiency was investigated, and the results shown in Table 2:

TABLE 2

| Antisolvent temperature (° C.) | Mean diameter (μm) | Encapsulation efficiency (%) |
|---|---|---|
| 20 | 53 | 41 |
| 9.6 | 42 | 59 |
| 4.9 | 36 | 68 |

Table 2 indicates that it is possible to change the size and encapsulation efficiency by changing the anti-solvent temperature.

Figure 4:
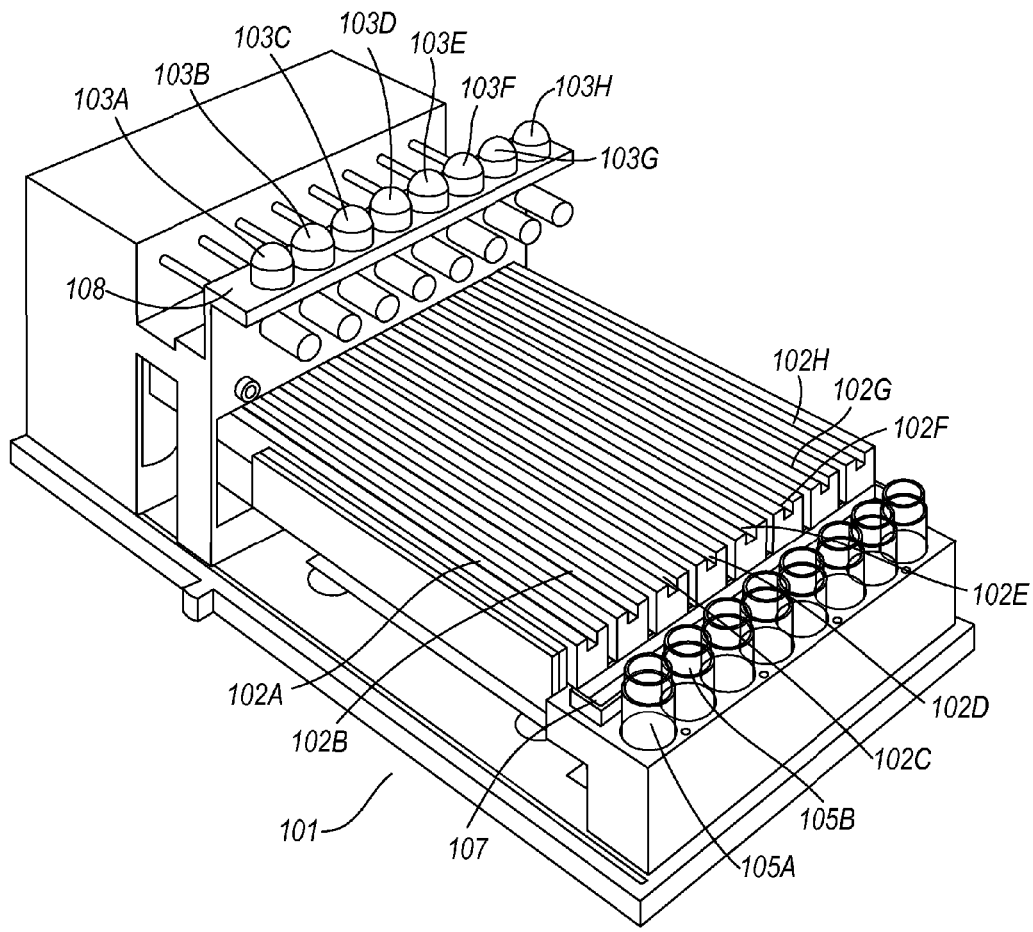
FIG. 4 shows a further example of an embodiment of an apparatus in accordance with the present invention.

FIG. 4 shows a further example of an embodiment of an apparatus in accordance with the present invention. The apparatus, denoted generally by reference numeral 101, comprises eight piezoelectric droplet generators 103a-h, each being located directly above a corresponding flow channel 102a-h. Each piezoelectric droplet generator 103a-h and flow channel 102a-h is operable to generate solid beads substantially as described above in relation to FIG. 1. A bead receiving trough 107 is provided to receive beads from all of the flow channels 102a-h. Eight waste receptacles (only two of which are labelled for clarity, 105a, 105b) are provided to receive waste from the piezoelectric droplet generators 103a-h during start up and cleaning. A video camera (not shown) is provided above each flow channel 102a-h to facilitate monitoring of the bead production process. A support 108 is provided which supports the piezoelectric droplet generators 103a-h in spaced relationship to the respective flow channels 102a-h.

Figure 5:
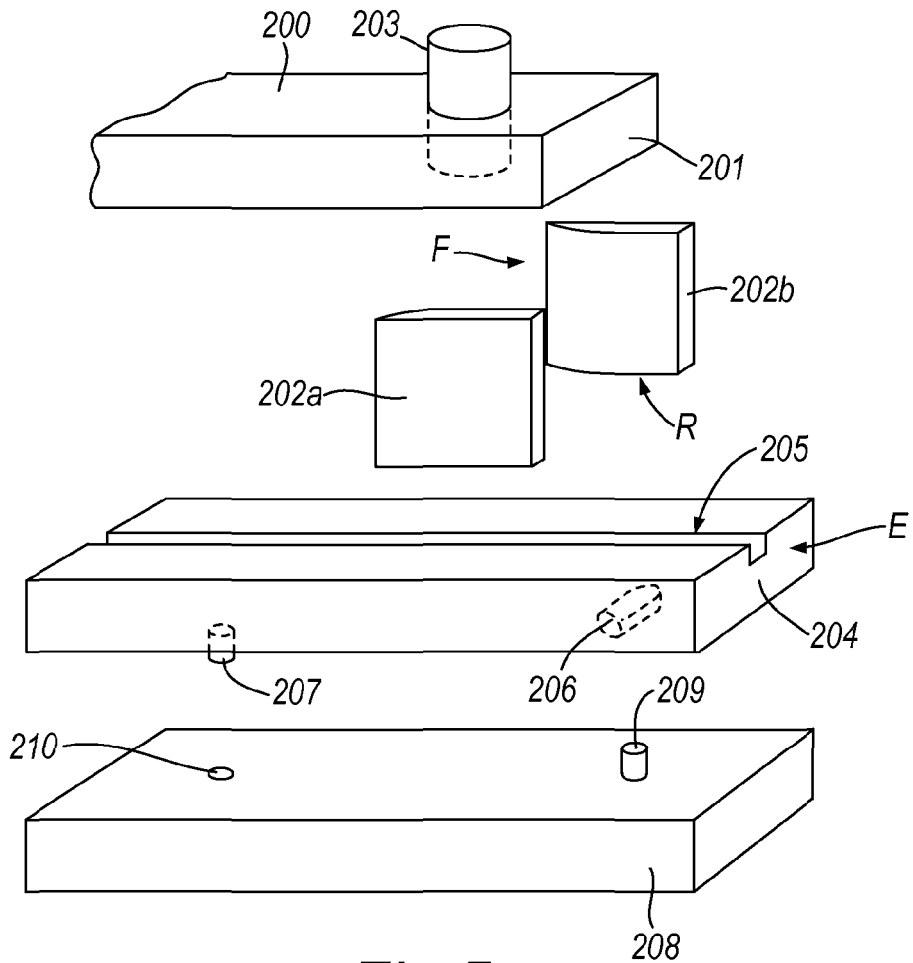
FIG. 5 is an exploded view of part of a further example of an apparatus in accordance with the present invention.
Figure 6:
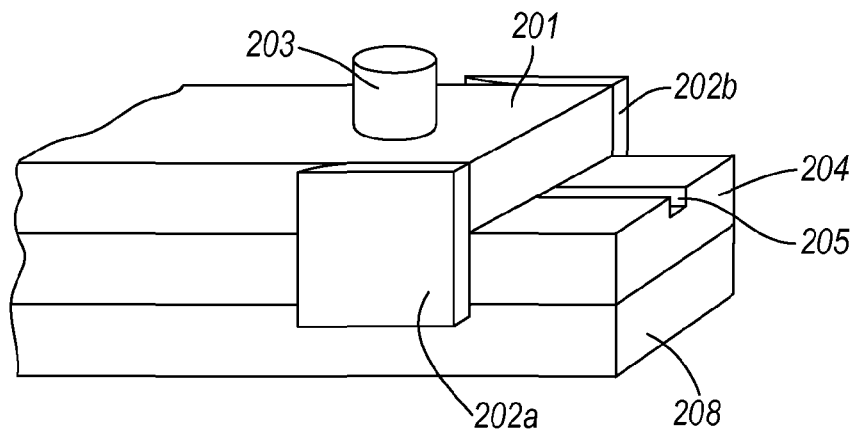
FIG. 6 is a perspective view of the part of the apparatus shown in FIG. 5.

A further embodiment of an apparatus in accordance with the present invention will now be described with reference to FIGS. 5 and 6. The apparatus is denoted generally by reference numeral 200. The apparatus 200 comprises a base 208, a fluid channel carrier 204 and a liquid droplet generator support 201. The fluid channel carrier 204 is provided with a channel 205 which, in use, carries a fluid into which droplets of liquid are deposited using the liquid droplet generator 201. The fluid channel carrier 204 is pivotally attached to the base 208. Pin 207 provided on the fluid channel carrier 204 is inserted into aperture 210 formed in base 208. Pin 209 provided on based 208 is inserted into slot 206 provided in the fluid channel carrier 204. The slot 206 is arcuate and permits pivotal movement of the fluid channel carrier 204 about the pivotal axis formed by pin 207 and aperture 210. The pivotal movement of the fluid channel carrier 204 facilitates alignment of the fluid channel 205 and the liquid droplet generator 203 as will now be described. Liquid droplet generator 203 is mounted on a liquid droplet generator support 201. The support is provided with two side portions, 202a, 202b. These are shown as being detached from the rest of the support 201 in FIG. 5, but this is merely for illustrative purposes. When the apparatus 200 is being set-up, fluid channel carrier 204 is placed on top of base 208. Liquid droplet generator support (with the liquid droplet generator 203 in place) is placed on top of the fluid channel carrier 204, with the end (E) of fluid channel carrier 204 being placed between the forward-most parts of side portions 202a, 202b, the forward-most parts being denoted by F. The spacing between the forward-most parts of the side portions is greater than the width of the fluid channel carrier 204. The liquid droplet generator support 201 is then moved across the fluid channel carrier 204 (in this case, from right to left in FIGS. 5 and 6) so that fluid channel carrier 204 is located between the side portions 202a, 202b as is shown in FIG. 6. The spacing between the side portions 202a, 202b at the rear of the side portions (the rear being denoted R) is essentially the same as the width of the fluid channel carrier 204 so that the fluid channel carrier 204 fits snugly between the rear parts of the side portions 202a, 202b. This snug fit ensures that the fluid channel 205 is correctly aligned with the liquid droplet dispenser 203 every time the apparatus 200 is set-up.

Figure 7:
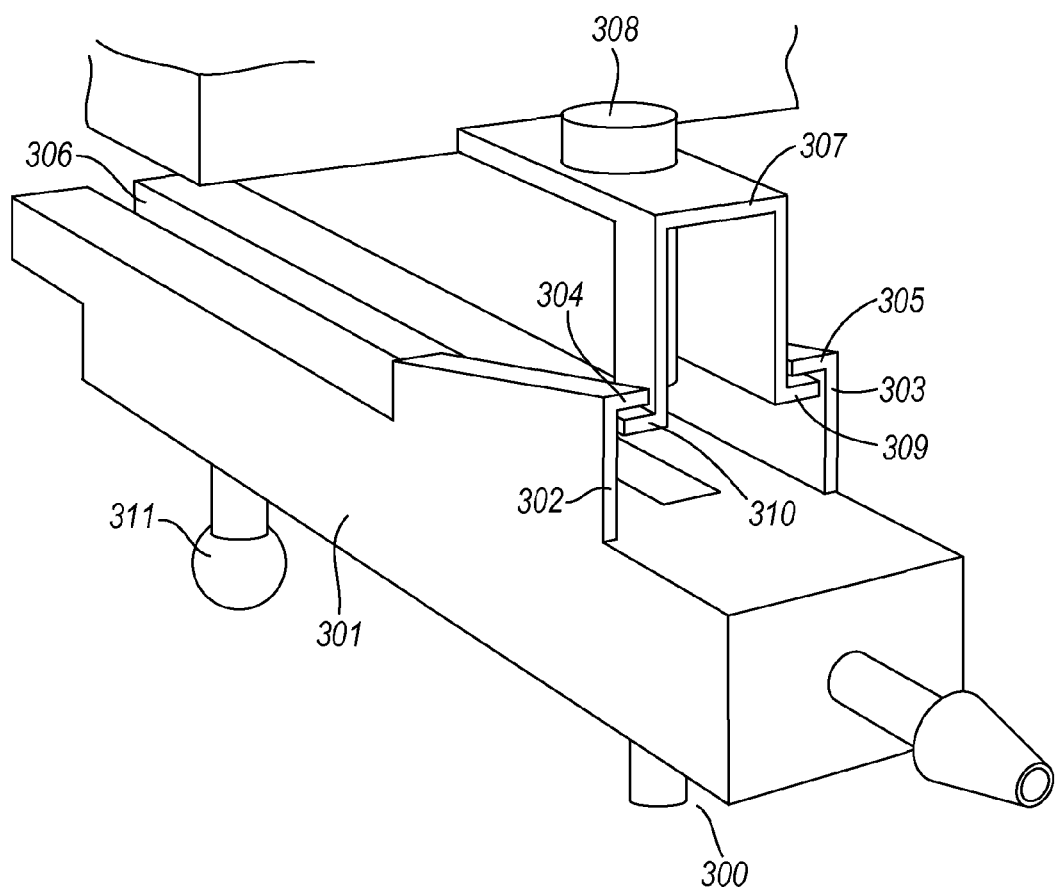
FIG. 7 is a perspective view of a prophetic further example of an apparatus in accordance with the present invention.

A prophetic example of a further embodiment on an apparatus in accordance with the present invention will now be described with reference to FIG. 7. The apparatus is denoted generally by reference numeral 300. The apparatus 300 comprises a liquid droplet dispenser 308 located above a fluid channel 306 so that liquid droplets may be dispensed from the dispenser 308 into a liquid provided in the fluid channel 306. The liquid droplet dispenser 308 is supported by a liquid droplet dispenser support 307. The support 307 is provided with two outwardly-projecting wing portions 309, 310. The upper surface of each wing portion 309, 310 contacts the lower surface of inwardly-projecting lips 304, 305 attached to the fluid channel carrier 301 with legs 302, 303. The lips 304, 305 are angled as shown in FIG. 7. Movement of the support 307 relative to the fluid channel carrier 301 causes the wing portions 309, 310 to move along lips 304, 305 respectively. This movement, coupled with the angled nature of the lips 304, 305, causes the fluid channel carrier 301 to tilt, the fluid channel carrier 301 tilting about ball joint 311. Tilting of the fluid channel has proved to be beneficial in helping to prevent beads from sticking to the end of the channel 306, which may happen if the channel 306 is formed in a material which does not have a low surface energy.

Beads have been produced which contain active ingredients other than leuprolide. For example, beads have been made which encapsulate leuprolide acetate, octreotide acetate, Exenatide acetate and salmon calcitonin. For example, those skilled in the art will realise that beads may be used to encapsulate pharmaceutically-active materials (or precursors thereof) which do not comprise peptides.

Beads have been produced from droplets using a solvent other than DMSO. For example, N-methylpyrrolidone (often known as NMP) and mixtures of glycofurol and polyethylene glycol) have been used. Those skilled in the art will realise that other liquids may be used to form droplets.

Beads have been produced by depositing droplets into a variety of droplet-receiving liquids. For example, various mixtures of water and alcohols have been used. The alcohols used include tert-butyl alcohol and iso-propyl alcohol.

The effect of pH on the morphology of the beads has been investigated by forming beads generally as mentioned above and depositing them into a liquid at a given pH (the chosen pH typically being from 3 to 9). The surface morphology of the beads was then determined using SEM. Qualitative data indicate that a low pH may cause the formation of the smooth surface morphology. It may therefore be possible to adapt the pH of the liquid into which the droplets are deposited to change the morphology of the bead to be produced.

It is desirable to remove the beads from the liquid. The beads may be filtered, for example, using a mesh (e.g. PharmaSep, Sweco, USA), which may be arranged to vibrate.

Other appropriate vacuum filtration systems or devices may also be used. Alternatively, the beads may be separated by density separation (for example, by being allowed to sink to the bottom of a suitably shaped receptacle).

The trough 107 may be replaced by a plurality of individual troughs, each individual trough being arranged to receive beads from one (and only one) flow channel.

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An apparatus for making solid beads, the apparatus comprising at least one liquid droplet generator, each comprising a piezoelectric element operable to generate droplets comprising a solute dissolved in a solvent, and at least one flow channel for carrying a second liquid, each liquid droplet generator being spaced relative to the flow channel so that, in use, the liquid droplets pass through a gas into a second liquid provided in said flow channel, the solvent being soluble in the second liquid so as to cause the solvent to exit the droplets, thus forming solid beads, the apparatus further comprising at least one camera arranged to monitor a region in which said droplets impact the second liquid.

2. An apparatus according to claim 1, wherein the liquid droplet generator is operable to eject the liquid droplets with a non-zero initial velocity through the gas into contact with the second liquid.

3. An apparatus according to claim 1, wherein at least one liquid droplet generator is located above the flow channel so that the droplets generated by the droplet generator may impact the second liquid provided in the flow channel.

4. An apparatus according to claim 1, comprising a plurality of flow channels for carrying the second liquid, each liquid droplet generator being typically arranged to said deposit liquid droplets into the flow channel.

5. An apparatus according to claim 1, wherein said at least one How channel is substantially U or V shaped in cross-section.

6. An apparatus according to claim 1, wherein the droplet generator comprises a droplet-generating orifice, the closest spacing between the droplet generating orifice and the surface of a flow of second liquid being from 1 to 50 mm.

7. An apparatus according to claim 1, comprising a heater for heating the liquid prior to the formation of the droplets.

8. An apparatus according to claim 1, comprising a cooler operable to cool the second liquid.

9. An apparatus according to claim 1, wherein the flow channel is laterally and/or pivotally movable.

10. An apparatus according to claim 1, comprising means for aligning the flow channel and the liquid droplet generator relative to one another to ensure that the liquid droplet generator is operable to dispense the droplets into the second liquid in the flow channel, wherein the flow channel is formed in a flow channel carrier and the means for aligning the flow channel and the liquid droplet generator comprises one or more alignment surfaces for contacting the flow channel carrier, contact of the one or more alignment surfaces with the flow channel carrier causing the flow channel carrier to be aligned to receive the droplets from the liquid droplet generator.

11. An apparatus according to claim 10, wherein the apparatus is provided with a liquid droplet generator support, in which case the one or more alignment surfaces is integral with, or attached to, the liquid droplet generator support.

12. An apparatus according to claim 1, comprising a flow channel tilter.

13. An apparatus according to claim 12, wherein the flow channel tilter comprises one or more first surfaces associated with the flow channel and one or more second surfaces associated with the liquid droplet generator, each first surface engaging with a corresponding second surface to tilt the flow channel.

14. An apparatus according to claim 13, wherein one or more of the first surfaces faces substantially downwards, and one or more of the second surfaces faces upwards and at least one of the first surfaces is provided by a laterally-projecting lip, and at least one of the second surfaces is provided by a projection.

15. An apparatus according to claim 13, wherein the apparatus is operable such that movement of the liquid droplet generator causes movement of the at least one second surface, movement of the at least one second surface relative to the first surface causing the degree of tilt of the flow channel to change.

16. An apparatus for making solid beads, the apparatus comprising a plurality of liquid droplet generators operable to generate a solute dissolved in a solvent, each liquid droplet generator comprising a piezoelectric component operable to generate droplets and a heater operable to heat the liquid to be dispensed as droplets, the apparatus comprising at least one flow channel for carrying a second liquid, the at least one flow channel and each of the said droplet generators being arranged and spaced relative to one another so that each droplet generator is operable to dispense droplets through a gas into the second liquid carried in the at least one flow channel, the apparatus comprising a cooler for cooling the second liquid in the said at least one flow channel, the solvent being soluble in the second liquid so as to cause the solvent to exit the droplets, thus forming solid beads, the apparatus comprising at least one camera arranged to monitor a region in which droplets impact the second liquid.

17. An apparatus for making solid beads, the apparatus comprising at least one liquid droplet generator operable to generate droplets comprising a solute dissolved in a solvent, and at least one flow channel for carrying a second liquid, at least one liquid droplet generator and at least one flow channel being spaced relative to one another so that, in use, liquid droplets pass through a gas into a second liquid provided in said flow channel, the solvent being soluble in the second liquid so as to cause the solvent to exit the droplets, thus forming solid beads, the apparatus being provided with a movable flow channel carrier and one of more alignment surfaces for contacting the flow channel carrier, contact of the one or more alignment surfaces with the flow channel carrier causing movement of the flow channel carrier relative to the liquid droplet generator, thereby facilitating alignment of the flow channel carrier and flow channel with the liquid droplet generator.

* * * * *